(12) United States Patent
Sullivan et al.

(10) Patent No.: US 11,262,644 B1
(45) Date of Patent: Mar. 1, 2022

(54) STRUCTURED LIGHT PROJECTOR WITH SOLID OPTICAL SPACER ELEMENT

(71) Applicant: Facebook Technologies, LLC, Menlo Park, CA (US)

(72) Inventors: Mark Sullivan, Mountain View, CA (US); Jonatan Ginzburg, Sunnyvale, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/408,968

(22) Filed: May 10, 2019

(51) Int. Cl.
    *G03B 21/14*     (2006.01)
    *G02B 27/09*     (2006.01)
    *G02B 27/42*     (2006.01)

(52) U.S. Cl.
    CPC ....... *G03B 21/142* (2013.01); *G02B 27/0944* (2013.01); *G02B 27/4233* (2013.01); *G03B 21/145* (2013.01)

(58) Field of Classification Search
    CPC ................ G03B 21/142; G03B 21/145; G02B 27/0944; G02B 27/4233
    See application file for complete search history.

(56) References Cited

U.S. PATENT DOCUMENTS

| | | | | |
|---|---|---|---|---|
| 2002/0054558 A1* | 5/2002 | Freeman | ................ | G11B 7/131 369/112.07 |
| 2005/0013562 A1* | 1/2005 | Tatehata | ............... | G02B 6/4201 385/93 |
| 2005/0063071 A1* | 3/2005 | Wang | .................... | G02B 5/1857 359/742 |
| 2009/0160965 A1* | 6/2009 | Sorek | ................ | H01L 27/14621 348/222.1 |
| 2010/0202725 A1* | 8/2010 | Popovich | ............... | G02B 27/48 385/10 |
| 2011/0188054 A1* | 8/2011 | Petronius | ............... | G02B 26/10 356/610 |
| 2016/0178915 A1* | 6/2016 | Mor | ........................ | H01S 5/423 359/573 |
| 2016/0197452 A1* | 7/2016 | Mor | .................... | G01B 11/2513 359/569 |
| 2016/0238855 A1* | 8/2016 | Kriman | ..................... | G02B 7/00 |
| 2017/0075205 A1* | 3/2017 | Kriman | .............. | G02B 19/0066 |
| 2017/0309685 A1* | 10/2017 | Heimgartner | ........... | H01L 24/94 |
| 2018/0063390 A1* | 3/2018 | Trail | .................... | H04N 5/2256 |
| 2019/0041656 A1* | 2/2019 | Ahmed | .................. | G02B 27/42 |
| 2019/0086776 A1* | 3/2019 | Hsiao | ................... | G02B 27/425 |
| 2019/0310541 A1* | 10/2019 | Zhang | ................ | G02B 27/4277 |
| 2019/0317390 A1* | 10/2019 | Lee | ....................... | G03B 21/208 |
| 2020/0033710 A1* | 1/2020 | Ma | ...................... | G02B 27/0905 |

* cited by examiner

*Primary Examiner* — Michelle M Iacoletti
*Assistant Examiner* — Magda Cruz
(74) *Attorney, Agent, or Firm* — FisherBroyles, LLP

(57) ABSTRACT

The disclosed structured light projector may include (1) a light source having a light-emitting side that emits light, (2) a solid optical spacer element having a first side securely coupled to the light-emitting side of the light source, and (3) a diffractive optical element (DOE) stack including one or more DOEs, where the DOE stack includes (a) a light-receiving side securely coupled to a second side of the solid optical spacer element opposite the first side, and (b) a light-emitting side opposite the light-receiving side that emits structured light in response to the light received from the light-emitting side of the light source via the solid optical spacer element. Various other devices and methods are also disclosed.

15 Claims, 15 Drawing Sheets

STRUCTURED LIGHT PROJECTOR WITH SOLID OPTICAL SPACER ELEMENT

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
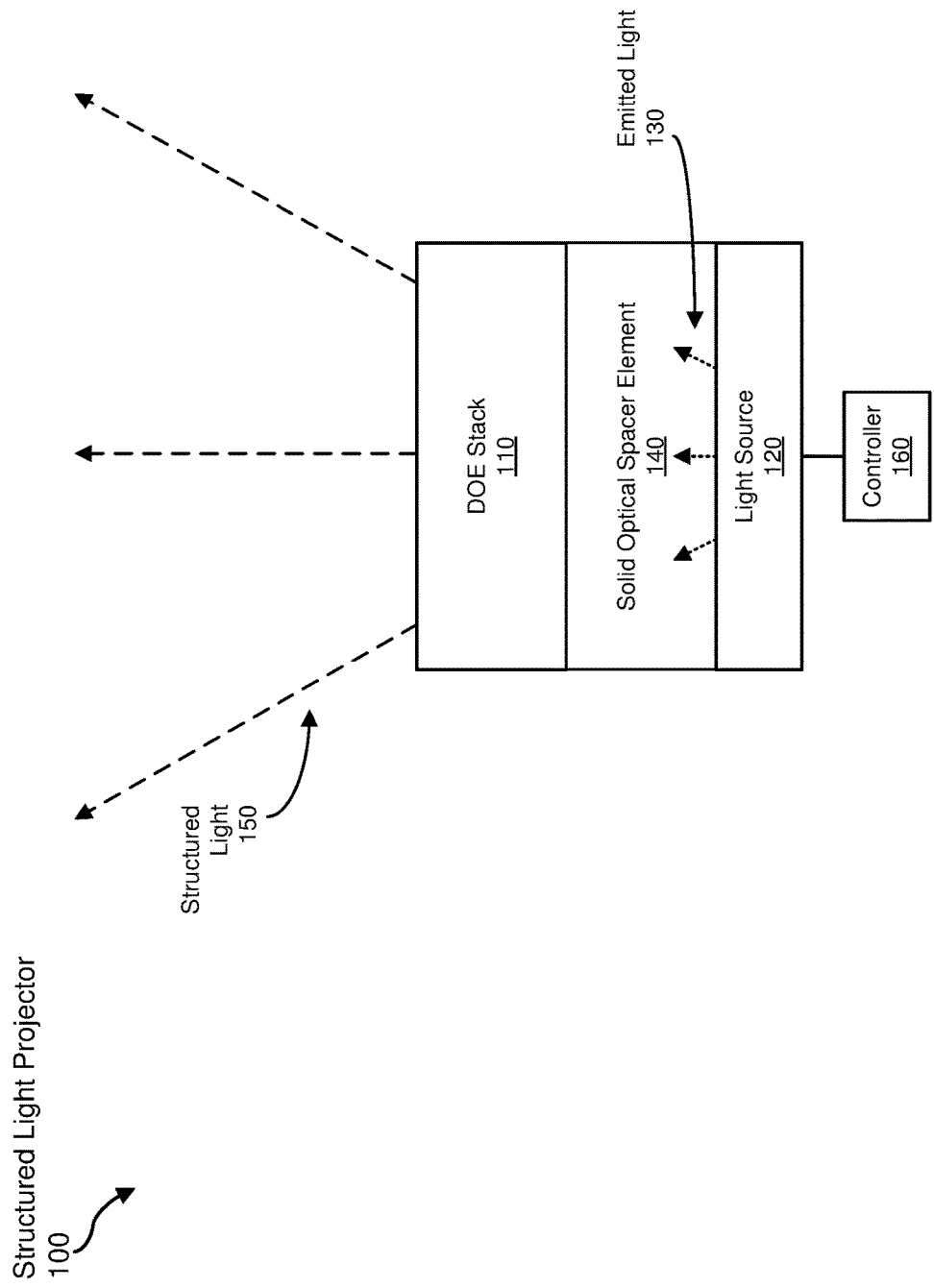
FIG. 1 is a block diagram of an exemplary structured light projector that includes a solid optical spacer element between a light source and a diffractive optical element (DOE) stack.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Structured light projectors, which, as the name indicates, project structured light (e.g., light patterns of dots, lines, or other geometric shapes) into a surrounding local environment, are typically employed to measure distances from a device incorporating the projector to various objects or surfaces in the environment. To measure those distances, a camera associated with the projector may be employed to capture an image of the portion of the structured light that is reflected toward the camera, and a processor may then analyze that image to ascertain or "map" the surfaces that are illuminated by the structured light.

In many conventional structured light projectors, a laser light source may be employed to generate light that may then pass through one or more diffractive optical elements (DOES) of a DOE stack, which may diffract the laser light to generate structured light that illuminates a particular field of view (FOV) of the surrounding environment. To facilitate efficient use of the DOE stack, the DOE stack is placed a significant distance (e.g., over half of the overall length of the projector) from the laser light source to the DOE stack so that a significant portion of the side of the DOE stack receiving the laser light is illuminated.

The present disclosure is generally directed to structured light projectors and associated methods that employ a solid optical spacer element that substantially bridges the length between the light source and the DOE stack. As will be explained in greater detail below, embodiments of the instant disclosure may provide additional mechanical stability to the structured light projector, as well as reduce or eliminate the amount of air space within the projector that may serve as an undesirable source of humidity and other contamination that may possibly lead to optical inaccuracy and/or operational hazards.

Features from any of the embodiments described herein may be used in combination with one another in accordance with the general principles described herein. These and other embodiments, features, and advantages will be more fully understood upon reading the following detailed description in conjunction with the accompanying drawings and claims.

The following will provide, with reference to FIGS. 1-15, detailed descriptions of various structured light projectors and corresponding methods that use a solid optical spacer element. A discussion of an exemplary structured light projector employing such a spacer is presented in conjunction with FIG. 1, and a brief discussion of exemplary types of DOEs employable in the structured light projectors disclosed herein is presented with respect to FIG. 2. Presentations of various exemplary embodiments of a structured light projector employing a solid optical spacer element are provided in connection with FIGS. 3-8. Exemplary methods of employing a solid optical spacer element to generate structured light are discussed in conjunction with FIG. 9, and methods of manufacturing such a projector are presented in association with FIG. 10. In conjunction with FIGS. 11 and 12, examples of a head-mounted display (HMD) system including an exemplary structured light projector, as described herein, are discussed. Several exemplary artificial reality systems that may incorporate such structured light projector systems are described in conjunction with FIGS. 13-15.

FIG. 1 is a block diagram of an exemplary structured light projector 100. In some examples, structured light projector 100 may include a DOE stack 110 including one or more DOEs, a solid optical spacer element 140, and a light source 120. Structured light projector 100, in at least some embodiments, projects structured light 150 (e.g., dots, lines, or other geometric shapes) into an environment surrounding structured light projector 100. In some examples, structured light projector 100 may be employed in conjunction with a camera or other light-sensing device (not shown in FIG. 1) that detects or captures reflections of structured light 150 from various objects or surfaces located in the surrounding environment. The captured or detected light, in some embodiments, may then be analyzed to map the objects and surfaces of the surrounding area.

In the example of FIG. 1, as well as others described hereinafter, an optical path from light source 120 through solid optical spacer element 140 to DOE stack 110 is shown as being directed vertically upward. This directional convention is utilized to simplify the following discussion. However, such an orientation of structured light projector 100 is not required and may assume any orientation relative to some reference direction in other examples.

In operation, in at least some embodiments, light source 120 may generate and emit light 130 toward DOE stack 110 via solid optical spacer element 140, instead of via an air-filled space. In some examples, as described in greater detail below, light source 120 may employ one or more light sources or devices (e.g., one or more infrared or visible-light lasers, such as Class 3R or Class 4 lasers) to generate emitted light 130. Additionally, if multiple such devices are used, such devices may be activated simultaneous, or at varying times, and with constant or varying levels of intensity or duty cycle. Light source 120, in some embodiments, may also include one or more additional optical components (e.g., a lightguide, a collimator, and/or the like) to further condition the light generated by light source 120 to produce emitted light 130. In some embodiments, a controller 160 (e.g., a hardware processor or controller, or a processor that executes one or more instructions of firmware, software, or the like) may control the operation of light source 120, including any light-emitting devices included therein.

DOE stack 110, in at least some examples, may receive emitted light 130 via solid optical spacer element 140 and project structured light 150 into the surrounding environment based on the received emitted light 130. In various embodiments, DOE stack 110 may include one or more DOEs that may generate a light pattern (e.g., dots, lines, or other geometric shapes) using emitted light 130 to produce structured light 150. Also, in some examples, multiple DOEs may be implemented within DOE stack 110 (e.g., to provide a large field of view (FOV) of the surrounding environment that is illuminated with structured light 150). In some embodiments, DOE stack 110 may include one or more additional optical components (e.g., a collimator) that conditions emitted light 130 for use by one or more other DOEs of DOE stack 110 to produce the desired structured light 150. In some embodiments, the DOE closest to solid optical spacer element 140 may be a collimator so that light received via solid optical spacer element 140 may be substantially collimated in preparation for the remaining DOEs of DOE stack 110 to generate structured light 150. Moreover, in some examples, two or more of the optical elements of DOE stack 110 may be substantially adjacent to each other, such that very little or no free-space or air-space region is present between the optical elements.

Also included in structured light projector 100 between light source 120 and DOE stack 110 may reside solid optical spacer element 140. In some embodiments, provides a solid monolithic optical medium (e.g., glass, silicon, etc.) that transfers emitted light 130 from light source 120 to DOE stack 110. As described in greater detail below, such medium may provide both the optical path between light source 120 and DOE stack 110 as well as the structural means (e.g., contact surfaces and so on) by which light source 120 and DOE stack 110 are mechanically coupled together to form a stable structure. In other examples, solid optical spacer element 140 may include a spacer housing in which an optical material (e.g., an optical polymer) has been injected, such that the optical material provides the optical path between light source 120 and DOE stack 110, while the spacer housing provides the mechanical means by which light source 120 and DOE stack 110 are coupled together to perform a stable structure.

As indicated in FIG. 1, solid optical spacer element 140 may employ a single optical element or material between a first side at which emitted light 130 is received from light source 120 and a second side at which emitted light 130 is directed to DOE stack 110. In some examples, a light-receiving surface of solid optical spacer element 140 that receives emitted light 130 may make contact with a light-emitting surface of light source 120 or with a small optical element (e.g., a microlens) optically coupled to the light-emitting surface of light source 120. In other embodiments, a small airgap (e.g., much less than the distance between light source 120 and DOE stack 110) may exist between the light-receiving surface of solid optical spacer element 140 and the light-emitting surface of light source 120 or with a small optical element optically coupled to the light-emitting surface of light source 120. Similarly, a surface of a second side of solid optical spacer element 140 from which light is directed toward DOE stack 110 may make contact with DOE stack 110, or a small airgap (e.g., much less than the distance between light source 120 and DOE stack 110) may be present between that surface of solid optical spacer element 140 and DOE stack 110.

In each of the embodiments described above, controller 160 may activate light source 120 (e.g., to produce light pulses for emitted light 130) to generate structured light 150. In addition, in some examples, controller 160 may control an image capture device (e.g., a camera) to detect the portion of structured light 150 reflected from a local environment and to analyze that reflected light to map the local environment. An example of such a system is described in greater detail below in conjunction with FIGS. 11 and 12.

Figure 2:
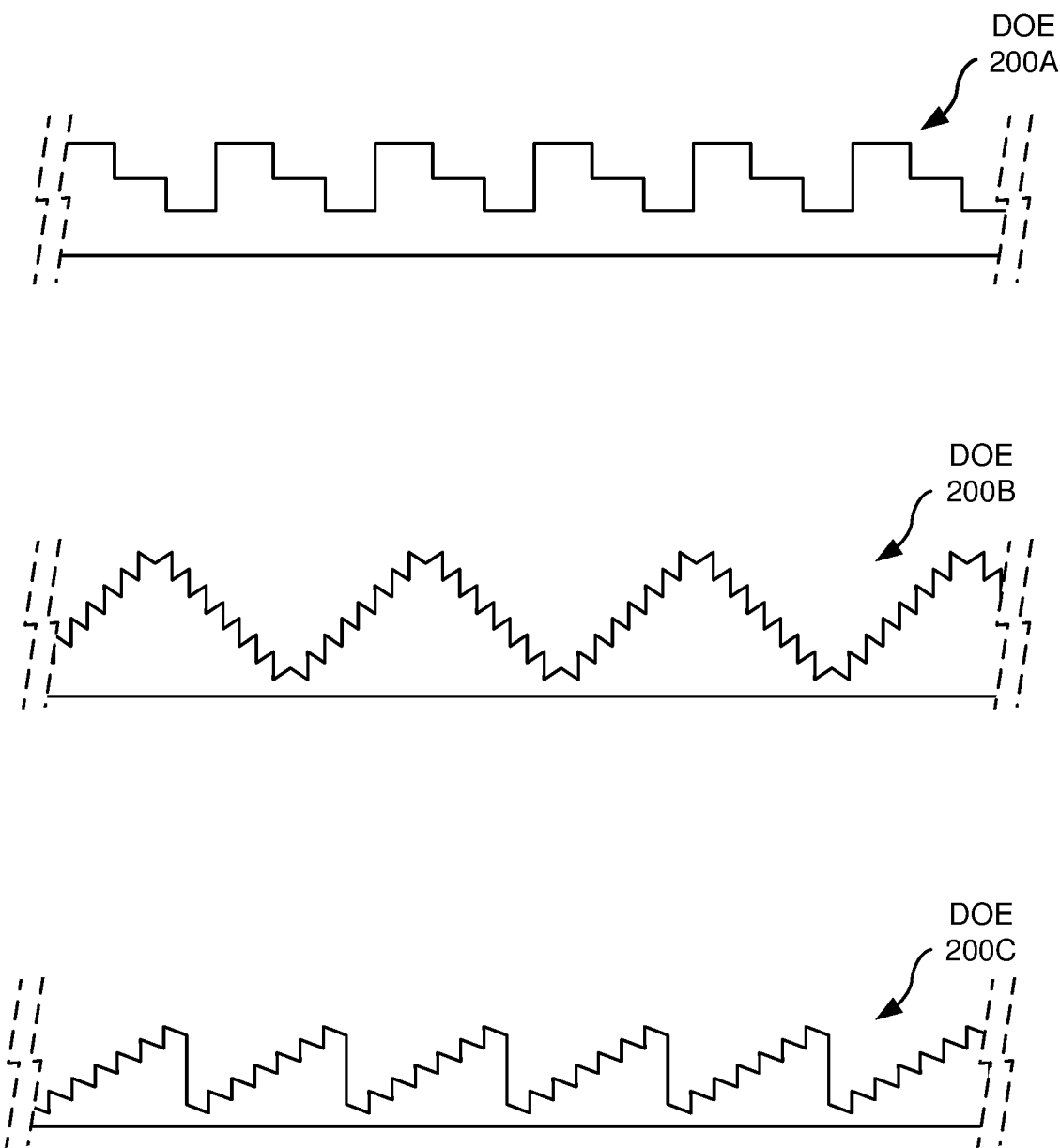
FIG. 2 is a side view of exemplary DOEs that may be included in the DOE stack of FIG. 1.

FIG. 2 provides exaggerated partial cross-sectional views of three different example DOEs 200 (more specifically, a first DOE 200A, a second DOE 200B, and a third DOE 200C) that may serve as one or more DOEs 200 of DOE stack 110. First DOE 200A includes, for example, a horizontal step pattern imposed as a micro-structured surface of DOE 200A. In some examples, the steps may have a top surface parallel to a bottom surface of DOE 200A. The width of the steps may be the same or different, and the height difference between adjacent steps may also be the same or different. The horizontal step pattern of DOE 200A may be the same across the entire structure or may have regions that are different (e.g., including a different step pattern). Second DOE 200B includes, for example, a series of pyramidal structures having steps on either side. These steps may be angled with respect to the bottom surface of DOE 200B. In some examples, the angles may be in a range from approximately 15 degrees to approximately 75 degrees and may be uniform or nonuniform, such that some of the steps may have different angled top surfaces. Third DOE 200C includes, for example, a structure with a plurality of steps (angled as shown, but parallel to the bottom surface of DOE 200C in other embodiments) that ascend to a highest step and then drop (rather than gradually descend, as in DOE 200B) to the lowest step in the pattern. In some embodiments, the depicted cross-sections of DOEs 200 may extend the full length of DOE 200. Other embodiments may include different cross-sectional configurations, such that the pattern varies in x- and y-directions of the top surface of DOE 200. In other embodiments, DOE 200 may be provided by diffraction gratings having different spacings therebetween. Additionally, while each of DOEs 200 is shown to employ a micro-structured surface on a single side of DOE 200, other DOEs 200 may employ micro-structured surfaces on both sides of DOE 200, or may employ another structure to generate structured light 150. In various embodiments, DOEs 200 may generated structured light 150 by diffracting received light (e.g., light originating from light source 120) to form the various features of structured light 150. In some embodiments, DOEs 200 may be substantially planar in appearance (e.g., by being substantially thinner in the vertical direction than in either horizontal direction, as depicted in FIG. 2).

FIGS. 3-8 are cross-sectional views of exemplary structured light projectors 300-800, respectively, that include a solid optical spacer element (e.g., solid optical spacer element 140 of FIG. 1) to transfer light from a light source (e.g., light source 120 of FIG. 1) to a DOE stack 110. In each of these embodiments, the light source may include a vertical-cavity surface-emitting laser (VCSEL) 322 that may be mounted upon a submount 324, which, in some embodiments, may provide electrical connections (e.g., power and ground connections, control and status signals, and the like) between VCSEL 322 and other components of the corresponding structured light projector (e.g., a controller, such as controller 160, a power supply, and so on). In some examples, submount 324 may also serve as a heat-conducting medium to dissipate heat generated by VCSEL 322. Other types of light sources aside from VCSEL 322 (e.g., other types of lasers, an addressable array of VCSELs or other lasers, and so on) may be employed in other examples. VCSEL 322 may produce light having a particular wavelength or range of wavelengths (e.g., in the visible spectrum, in the infrared (IR) spectrum, and the like).

As discussed above, DOE stack 110 may include one or more DOEs 200. In some embodiments, DOEs 200 may include other types of optical elements not depicted in FIG. 2, such as collimators. While FIGS. 3-8 illustrate the use of three DOEs 200 in DOE stack 110, greater or fewer DOEs 200 may be employed in other embodiments of DOE stack 110. In some examples, DOEs 200 may be bonded (e.g., using an adhesive, such as along a perimeter of DOEs 200), clamped, or otherwise coupled together to form DOE stack 110. In some embodiments, small air-space regions may be located between one or more pairs of DOEs 200, while in other examples, two or more adjacent DOEs 200 may be aligned so that no such air-space region exists therebetween.

In some examples, each DOE 200 of DOE stack 110 may include a different micro-structured surface such that a first DOE 200 generates a first light pattern based on the received emitted light 130, and a second DOE 200 (e.g., adjoining a top surface of first DOE 200) generates structured light 150 based on the first light pattern. Further, in such embodiments, first DOE 200 may provide a particular FOV for the first light pattern, while second DOE 200 may further broaden the resulting FOV to yield the FOV exhibited by structured light 150. DOEs 200 may be manufactured using, for example, without limitation, injection compression molding, nano-imprinting (e.g., using one or more etchants), or nano-replication.

Also, versions of a solid optical spacer element (e.g., serving as solid optical spacer element 140 of FIG. 1) coupled to VCSEL 322 and submount 324 in different ways are depicted in FIGS. 3-8. More specifically, in FIGS. 3-5, the solid optical spacer element of structured light projectors 300, 400, and 500, respectively, may include a spacer housing 342 that may be mechanically coupled at a first side of the solid optical spacer element to submount 324 and mechanically coupled at a second side to DOE stack 110. In some examples, spacer housing 342 may be similar in construction to a spacer that couples a light source to a DOE stack while providing a significant air gap therebetween. However, in the examples of FIGS. 3-5, the solid optical space element may also include an injected optical polymer 344 that may be injected into a void or open space defined by spacer housing 342 during the manufacturing process, thus reducing or eliminating air spaces between VCSEL 322, injected optical polymer 344, and DOE stack 110. This air-space reduction may result in reduced humidity and other possible contamination within the structured light projector that may lead to operational hazards, such as undesired concentration or misdirection of the light emitted from VCSEL 322. In some embodiments, the combination of spacer housing 342 and injected optical polymer 344 may also provide an increased level of structural strength for the projector, as well as better athermalization, possibly resulting in added stability in the optical characteristics of the projector. Further, such an arrangement may result in an improved coefficient of thermal expansion (CTE) for greater dimensional stability over a range of operating temperatures.

In some examples, injected optical polymer 344 may be silicon, although other injectable optical materials may be employed in other embodiments. In some cases, injected optical polymer 344 may provide an index of refraction that is greater than that of air, which may result in a longer overall distance between VCSEL 322 and DOE stack 110. This longer distance may cause a more precise light pattern for structured light 150, possibly resulting in less sensitivity of overall mapping system to the particular local environment in which the system is being employed. In other examples, a relatively low refractive index (e.g., less than or equal to one) may be employed to maintain or reduce the overall distance between VCSEL 322 and DOE stack 110.

Figure 6:
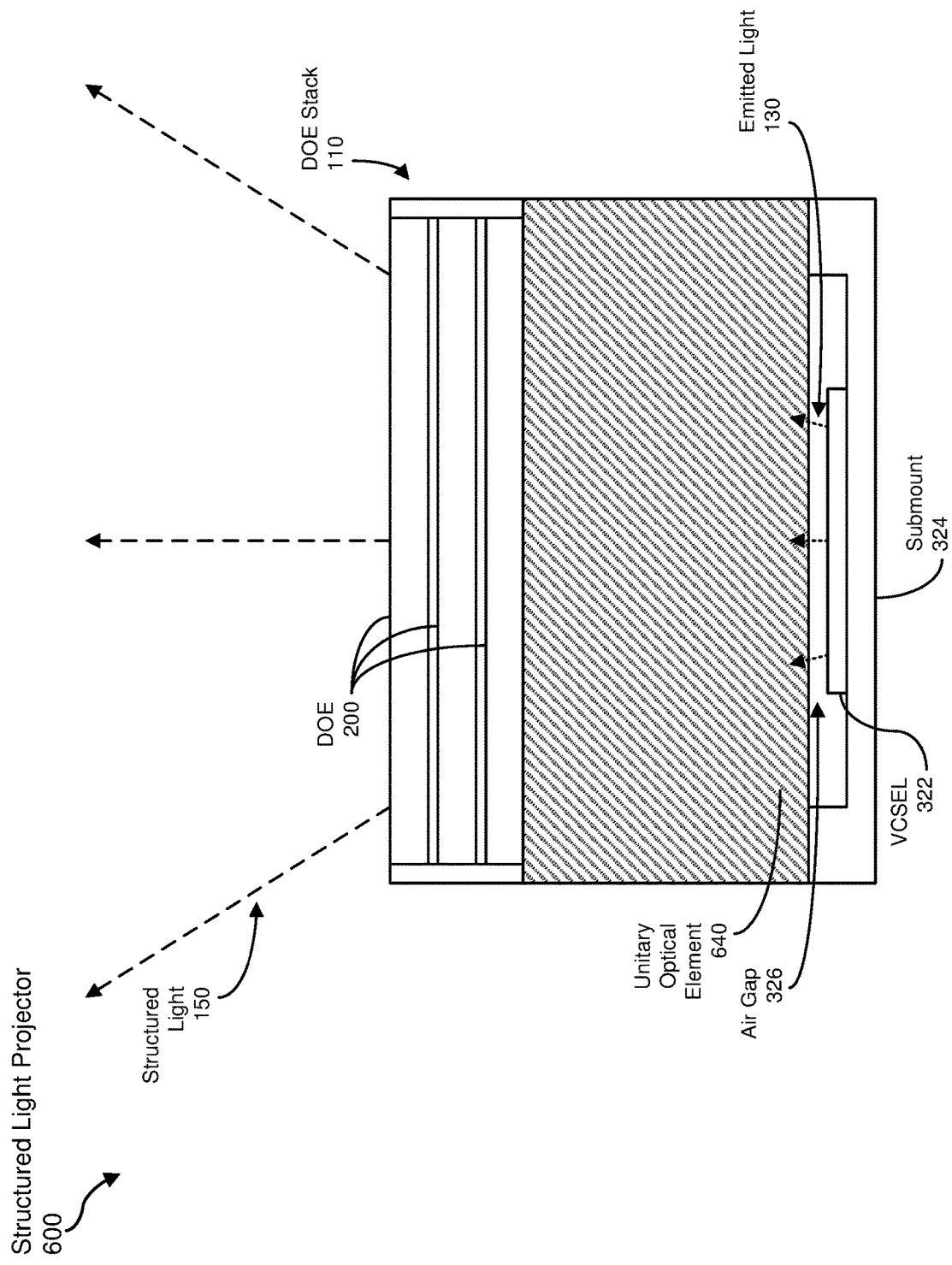
FIG. 6 is a cross-sectional view of an exemplary structured light projector with a solid optical spacer element that includes a unitary optical element, where the projector defines an air gap between the light source and the unitary optical element.
Figure 7:
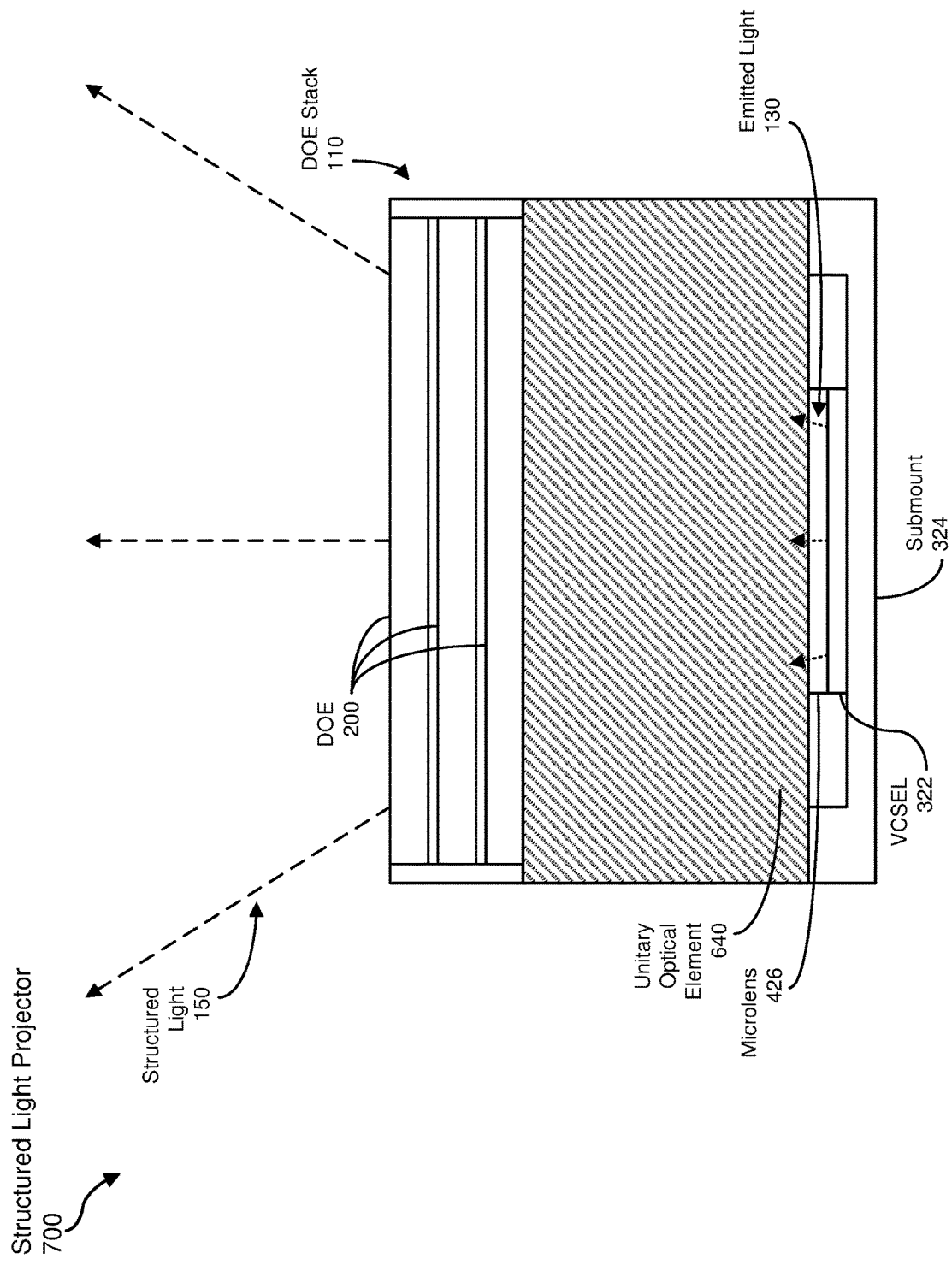
FIG. 7 is a cross-sectional view of an exemplary structured light projector with a solid optical spacer element that includes a unitary optical element, where the projector further includes a microlens between the light source and the unitary optical element.
Figure 8:
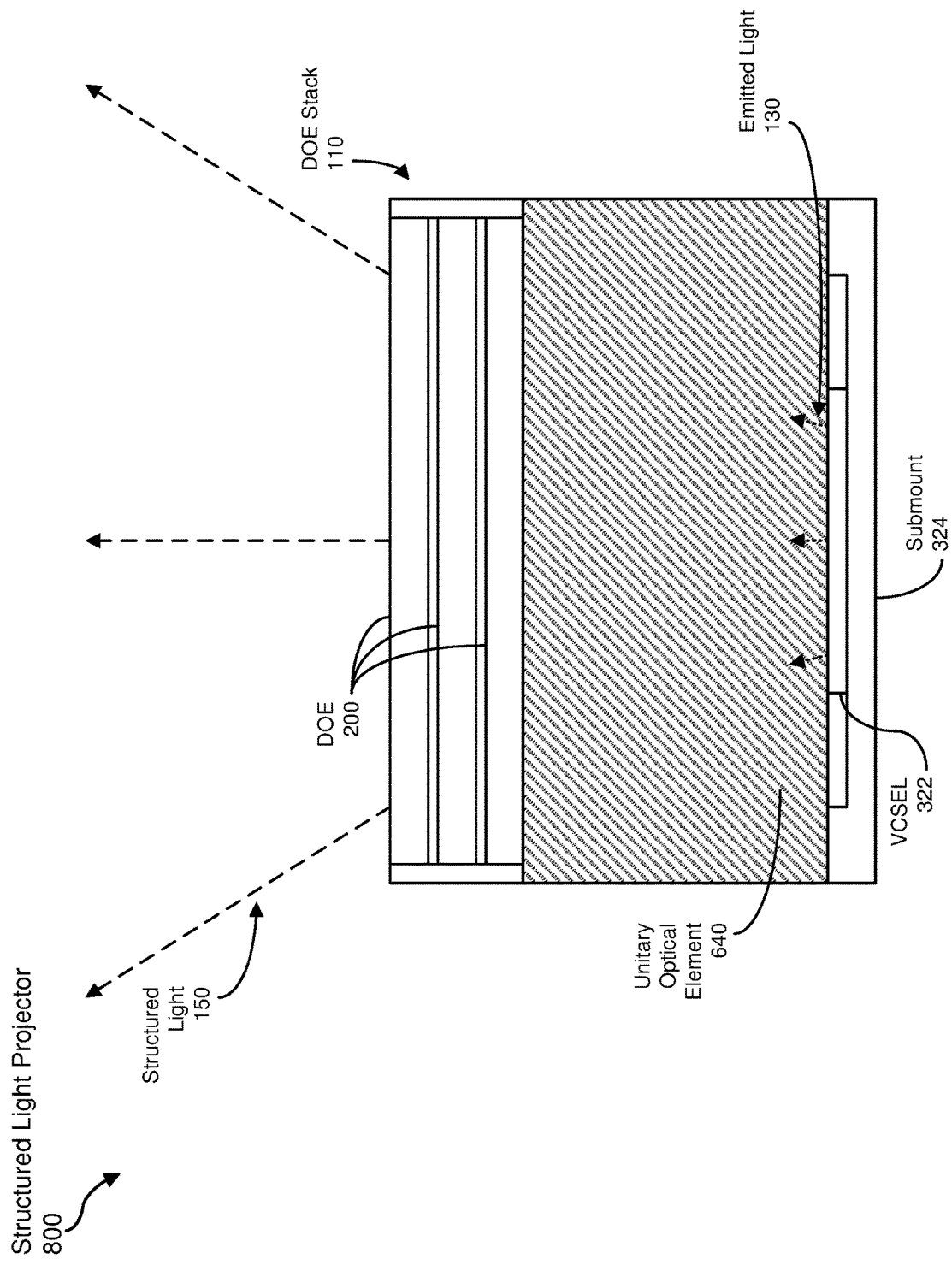
FIG. 8 is a cross-sectional view of an exemplary structured light projector with a solid optical spacer element that includes a unitary optical element that contacts a light-emitting side of the light source.

In FIGS. 6-8, structured light projectors 600, 700, and 800, respectively, may employ a different type of solid optical spacer element that includes a unitary optical element 640 that may mechanically couple the light-emitting side of the light source (e.g., VCSEL 322 via submount 324) to the light-receiving side of DOE stack 110, as well as deliver emitted light 130 provided by VCSEL 322 to the light-receiving side of DOE stack 110. In some embodiments, unitary optical element 640 may be a single continuous block of optical material, such as glass or a polymer. Also, as with injected optical polymer 344, unitary optical element 640 may possess a relatively high refractive index (e.g., greater than one) or a relatively low refractive index (e.g., less than or equal to one) based on the particular optical material employed.

Consequently, in structured light projectors 600, 700, and 800 of FIGS. 6-8, the use of unitary optical element 640 may reduce or eliminate air spaces between VCSEL 322, unitary optical element 640, and DOE stack 110, which may prevent or reduce humidity and other possible contamination within the structured light projector. Such embodiments may also provide increased structural strength, better athermalization (e.g., for added optical characteristic stability) and improved CTE (e.g., for greater dimensional stability over a range of temperatures), as noted above with respect to structured light projectors 300, 400, and 500 of FIGS. 3-5.

In each of FIGS. 3-8, submount 324 may provide a recessed region in which VCSEL 322 or another light-emitting device may be mounted. The recessed region may allow the solid optical spacer element (e.g., injected optical polymer 344 in spacer housing 342, or unitary optical element 640) to be coupled to a surface of submount 324 external to the recessed region while providing little-to-no airgap between a light-emitting surface of VCSEL 322 and a light-receiving surface of the light-transferring portion of the solid optical spacer element (e.g., injected optical polymer 344 or unitary optical element 640). More specifically, in structured light projector 300 of FIG. 3, the recessed region of submount 324 provides sufficient depth to produce an air gap 326 between the light-emitting surface of VCSEL 322 and the light-receiving side of injected optical polymer 344.

Figure 4:
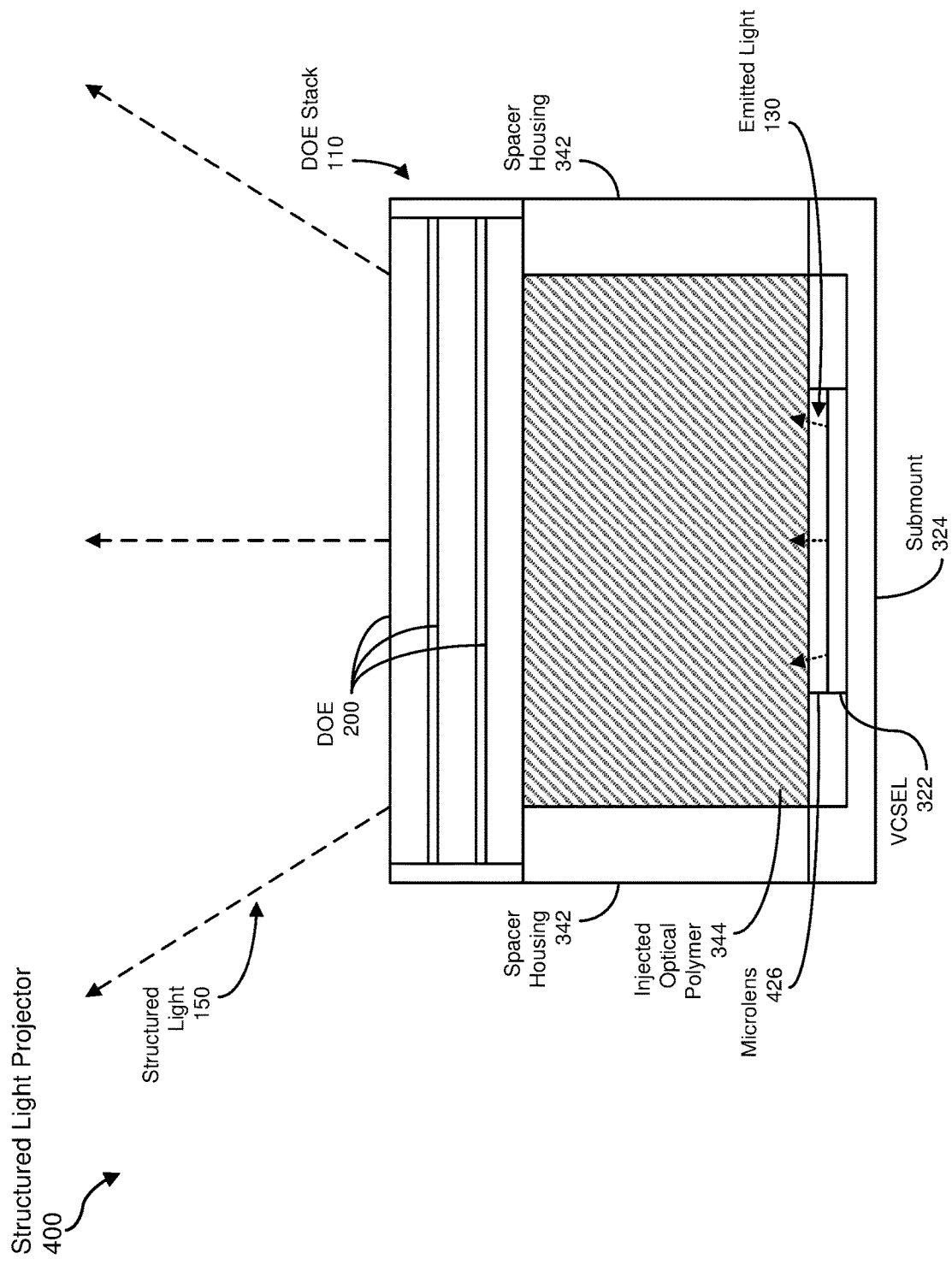
FIG. 4 is a cross-sectional view of an exemplary structured light projector with a solid optical spacer element that includes an injected optical polymer, where the projector further includes a microlens between the light source and the injected optical polymer.

In structured light projector 400 of FIG. 4, the recessed region of submount 324 facilitates the use of a microlens 426 atop VCSEL 322 to focus emitted light 130 into injected optical polymer 344. As depicted in FIG. 4, the light-receiving side of injected optical polymer 344 contacts microlens 426, thus resulting in no air gap therebetween. In other embodiments, however, a small air gap may be maintained between the light-receiving side of injected optical polymer 344 and microlens 426.

Figure 5:
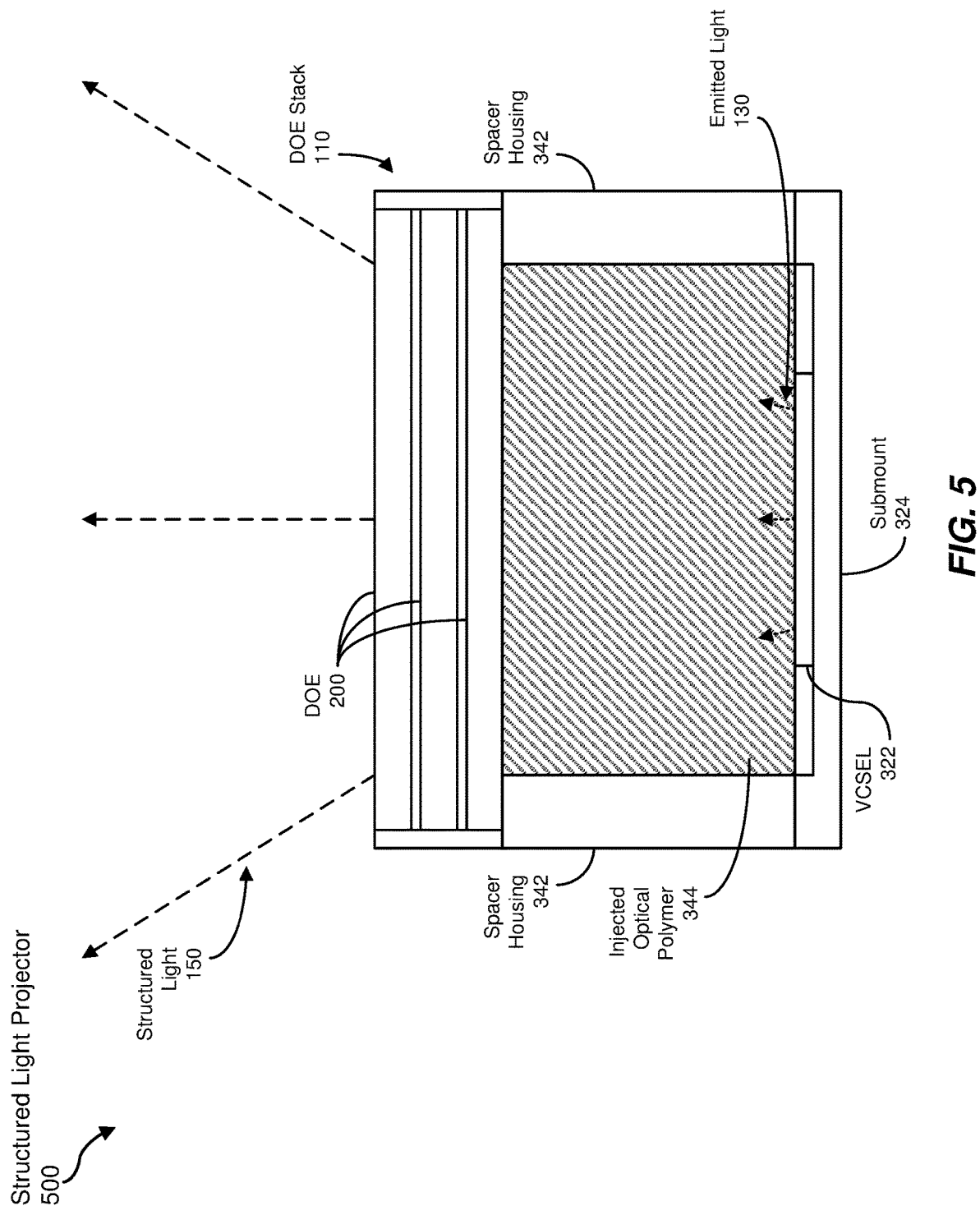
FIG. 5 is a cross-sectional view of an exemplary structured light projector with a solid optical spacer element that includes an injected optical polymer that contacts a light-emitting side of the light source.

With respect to structured light projector 500 of FIG. 5, the recessed region of submount 324 may be configured such that the light-receiving surface of injected optical polymer 344 contacts the light-emitting surface of VCSEL 322, resulting in no air gap between injected optical polymer 344 and VCSEL 322. In some examples, such a configuration may be implemented where injected optical polymer 344 is constructed of a dielectric material.

Figure 3:
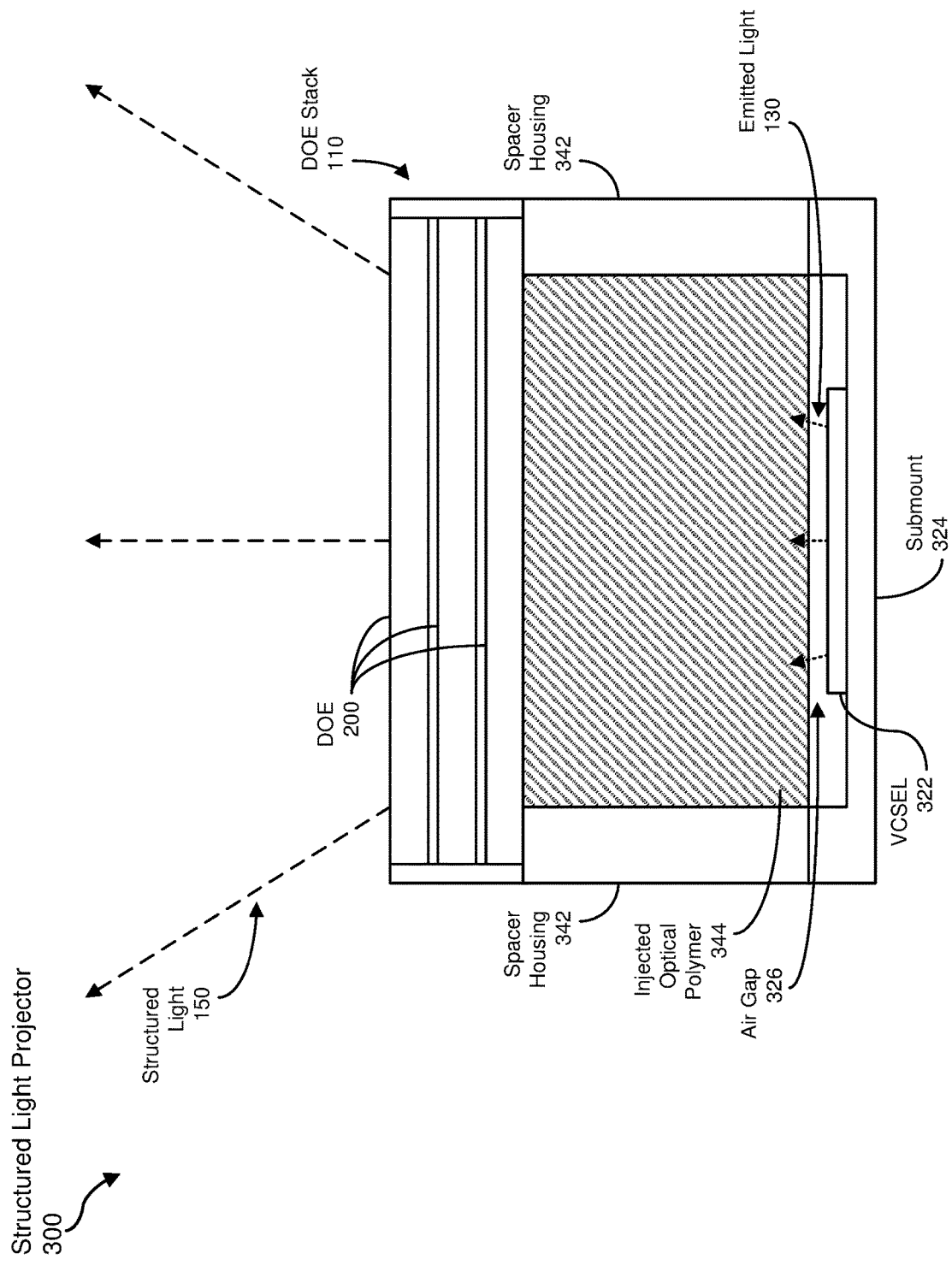
FIG. 3 is a cross-sectional view of an exemplary structured light projector with a solid optical spacer element that includes an injected optical polymer, where the projector defines an air gap between the light source and the injected optical polymer.

In structured light projectors 300, 400, and 500 of FIGS. 3, 4, and 5, respectively, spacer housing 342 and injected optical polymer 344 are illustrated as forming planar surfaces at both the light-receiving side (e.g., the bottom side) and the light-emitting side (e.g., the top side) thereof. However, other embodiments of structured light projectors 300, 400, and 500 may not be limited in such a fashion. For example, spacer housing 342 may extend below the light-receiving surface of inject optical polymer 344, thus possibly facilitating the use of a submount 324 that does not provide a recessed region in which VCSEL 322 resides.

Embodiments of structured light projectors 600, 700, and 800 of FIGS. 6, 7, and 8, respectively, that employ unitary optical element 640 may be mechanically coupled with submount 324 carrying VCSEL 322 in a manner corresponding to structured light projectors 300, 400, and 500, of FIGS. 3, 4, and 5, as described above. More specifically, in structured light projector 600 of FIG. 6, submount 324 may be configured such that air gap 326 is provided between the light emitting-surface of VCSEL 322 and the light-receiving surface of unitary optical element 640 due to the depth of the recessed region of submount 324. In structured light projector 700 of FIG. 7, submount 324 may be configured such that microlens 426 positioned atop the light-emitting surface of VCSEL 322 makes contact with the light-receiving surface of unitary optical element 640 or provides a small air gap therebetween. With respect to structured light projector 800 of FIG. 8, the recessed region of submount 324 may be configured such that contact is made between the light-emitting surface of VCSEL 322 and the light-receiving surface of unitary optical element 640.

Figure 9:
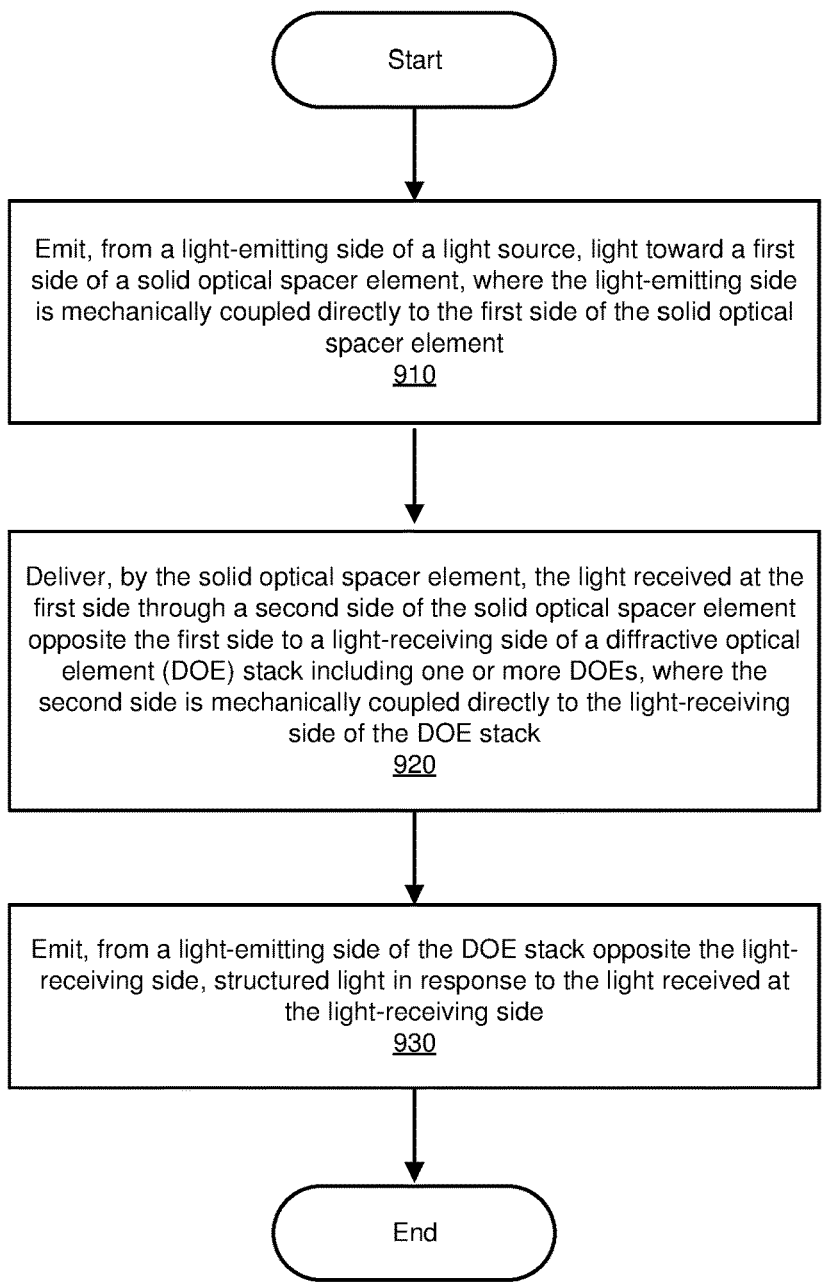
FIG. 9 is a flow diagram of an exemplary method of generating structured light using a structured light projector with a solid optical spacer element.

FIG. 9 is a flow diagram of an exemplary method 900 of generating structured light (e.g., using any of the structured light projectors of FIGS. 1 and 3-8). In method 900, at step 910, light may be emitted from a light-emitting side of a light source (e.g., light source 120, or VCSEL 322 mounted on submount 324) toward a first side of a solid optical spacer element (e.g., solid optical spacer element 140, injected optical polymer 344 within spacer housing 342, or unitary optical element 640), where the light-emitting side is mechanically coupled (e.g., using submount 324) to the first side of the solid optical spacer element (e.g., at the spacer housing 342 or unitary optical element 640).

At step 920, the light received at the first side of the solid optical spacer element may be delivered through a second side of the solid optical spacer element opposite the first side to a light-receiving side of a DOE stack (e.g., DOE stack 110) including one or more DOEs (e.g., DOEs 200). In some embodiments, the second side may be mechanically coupled directly (e.g., at the spacer housing 342 or unitary optical element 640) to the light receiving side of the DOE stack.

At step 930, structured light (e.g., structured light 150) may be emitted from a light-emitting side of the DOE stack opposite the light-receiving side in response to the light received at the light-receiving side of the DOE stack.

Figure 10:
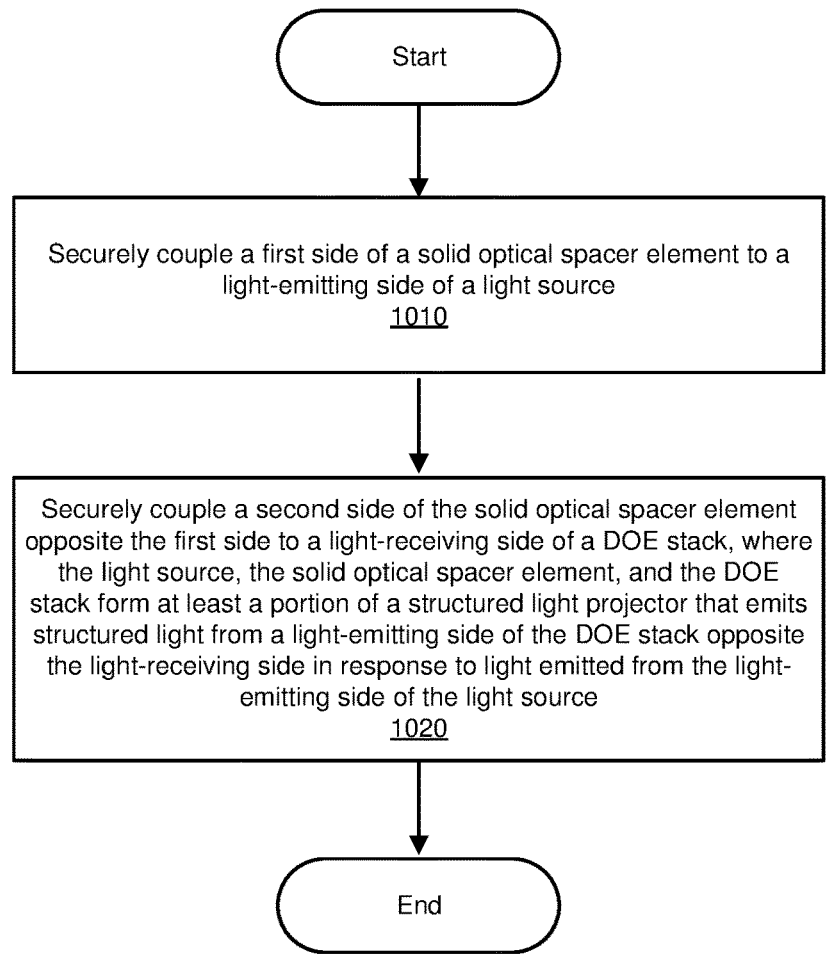
FIG. 10 is a flow diagram of an exemplary method of manufacturing a structured light projector with a solid optical spacer element.

FIG. 10 is a flow diagram of an exemplary method 1000 of manufacturing a structured light projector (e.g., any of the structured light projectors of FIGS. 1 and 3-8). In method 1000, at step 1010, a first side of a solid optical spacer element (e.g., solid optical spacer element 140, injected optical polymer 344 within spacer housing 342, or unitary optical element 640) may be securely coupled to a light-emitting side of a light source (e.g., light source 120, or VCSEL 322 mounted on submount 324). In some embodiments, such coupling may occur via submount 324 and either spacer housing 342 or unitary optical element 640.

At step 1020, a second side of the solid optical spacer element opposite the first side may be securely coupled to a light-receiving side of a DOE stack (e.g., DOE stack 110), where the light source, the solid optical spacer element, and the DOE stack form at least a portion of a structured light projector (e.g., structured light projector 100, 300, 400, 500, 600, 700, or 800) that emits structured light (e.g., structured light 150) from a light-emitting side of the DOE stack opposite the light-receiving side in response to light emitted from the light-emitting side of the light source. In some embodiments, the light source, the solid optical spacer element, and the DOE stack may be coupled together by way of fasteners (e.g., screws, clamps, or the like), an adhesive, or other means.

As discussed above in conjunction with FIGS. 1-10, a solid optical spacer element may be employed to transfer light emitted from a VCSEL or other light source to DOE stack to generate structured light. In at least some examples, use of the solid optical spacer element may facilitate filling what may otherwise be an air-filled void with optical material, possibly leading to increased mechanical strength, optical stability, and/or operational safety over more conventional structured light projector designs.

EXAMPLE EMBODIMENTS

Example 1: A structured light projector that may include (1) a light source having a light-emitting side that emits light, (2) a solid optical spacer element having a first side securely coupled to the light-emitting side of the light source, and (3) a diffractive optical element (DOE) stack including one or more DOEs, where the DOE stack includes (a) a light-receiving side securely coupled to a second side of the solid optical spacer element opposite the first side, and (b) a light-emitting side opposite the light-receiving side that emits structured light in response to light received from the light-emitting side of the light source via the solid optical spacer element.

Example 2: The structured light projector of Example 1, where the solid optical spacer element may include (1) a spacer housing that mechanically couples the light-emitting side of the light source to the light-receiving side of the DOE stack, and (2) an injected optical polymer residing within the spacer housing that delivers the light emitted from the light source to the light-receiving side of the DOE stack.

Example 3: The structured light projector of Example 2, where the injected optical polymer may include silicon.

Example 4: The structured light projector of Example 1, where the solid optical spacer element may include a unitary optical element that (1) mechanically couples the light-emitting side of the light source to the light-receiving side of the DOE stack, and (2) delivers the light emitted from the light source to the light-receiving side of the DOE stack.

Example 5: The structured light projector of any one of Examples 1-4, where the light source may include (1) a light-emitting device, and (2) a submount, where the light-emitting device is mounted to the submount.

Example 6: The structured light projector of Example 5, where the light-emitting device may be a vertical-cavity surface-emitting laser (VCSEL).

Example 7: The structured light projector of Example 5, where (1) the submount may include a recessed region in which the light-emitting device is mounted, and (2) the solid optical spacer element may contact the submount at a surface external to the recessed region.

Example 8: The structured light projector of Example 7, where the recessed region may define an air gap between a light-emitting surface of the light-emitting device and the first side of the solid optical spacer element.

Example 9: The structured light projector of Example 7, further including an optical element that may bridge a space between a light-emitting surface of the light-emitting device and the first side of the solid optical spacer element.

Example 10: The structured light projector of Example 9, where the optical element may include a microlens.

Example 11: The structured light projector of Example 7, where the first side of the solid optical spacer element may contact a light-emitting surface of the light-emitting device.

Example 12: The structured light projector of any one of Examples 1-4, where the DOE stack may include a collimating optical element that defines the light-receiving side of the DOE stack.

Example 13: The structured light projector of any one of Examples 1-4, further including at least one mechanical fastener that may securely couple the light source, the solid optical spacer element, and the DOE stack together.

Example 14: The structured light projector of any one of Examples 1-4, where the light source, the solid optical spacer element, and the DOE stack may be secured together using an adhesive.

Example 15: A method of generating structured light that may include (1) emitting, from a light-emitting side of a light source, light toward a first side of a solid optical spacer element, where the light-emitting side is mechanically coupled directly to the first side of the solid optical spacer element, (2) delivering, by the solid optical spacer element, the light received at the first side through a second side of the solid optical spacer element opposite the first side to a light-receiving side of a diffractive optical element (DOE) stack including one or more DOEs, where the second side is mechanically coupled directly to the light-receiving side of the DOE stack, and (3) emitting, from a light-emitting side of the DOE stack opposite the light-receiving side, structured light in response to the light received at the light-receiving side.

Example 16: The method of Example 15, where the light emitted from the light-emitting side of the light source may cross an air gap before reaching the first side of the solid optical spacer element.

Example 17: The method of Example 15, where light emitted from the light-emitting side of the light source may pass to the first side of the solid optical spacer element via a microlens.

Example 18: A method of manufacturing a structured light projector that may include (1) securely coupling a first side of a solid optical spacer element to a light-emitting side of a light source, and (2) securely coupling a second side of the solid optical spacer element opposite the first side to a light-receiving side of a diffractive optical element (DOE) stack including one or more DOEs, where the light source, the solid optical spacer element, and the DOE stack form at least a portion of a structured light projector that emits structured light from a light-emitting side of the DOE stack opposite the light-receiving side in response to light emitted from the light-emitting side of the light source.

Example 19: The method of Example 18, where the solid optical space element may include (1) a spacer housing that mechanically couples the light-emitting side of the light source to the light-receiving side of the DOE stack, and (2) an injected optical polymer residing within the spacer housing that delivers the light emitted from the light source to the light-receiving side of the DOE stack.

Example 20: The method of Example 18, where the solid optical spacer element may include a unitary optical element that (1) mechanically couples the light-emitting side of the light source to the light-receiving side of the DOE stack, and (2) delivers the light emitted from the light source to the light-receiving side of the DOE stack.

Figure 11:
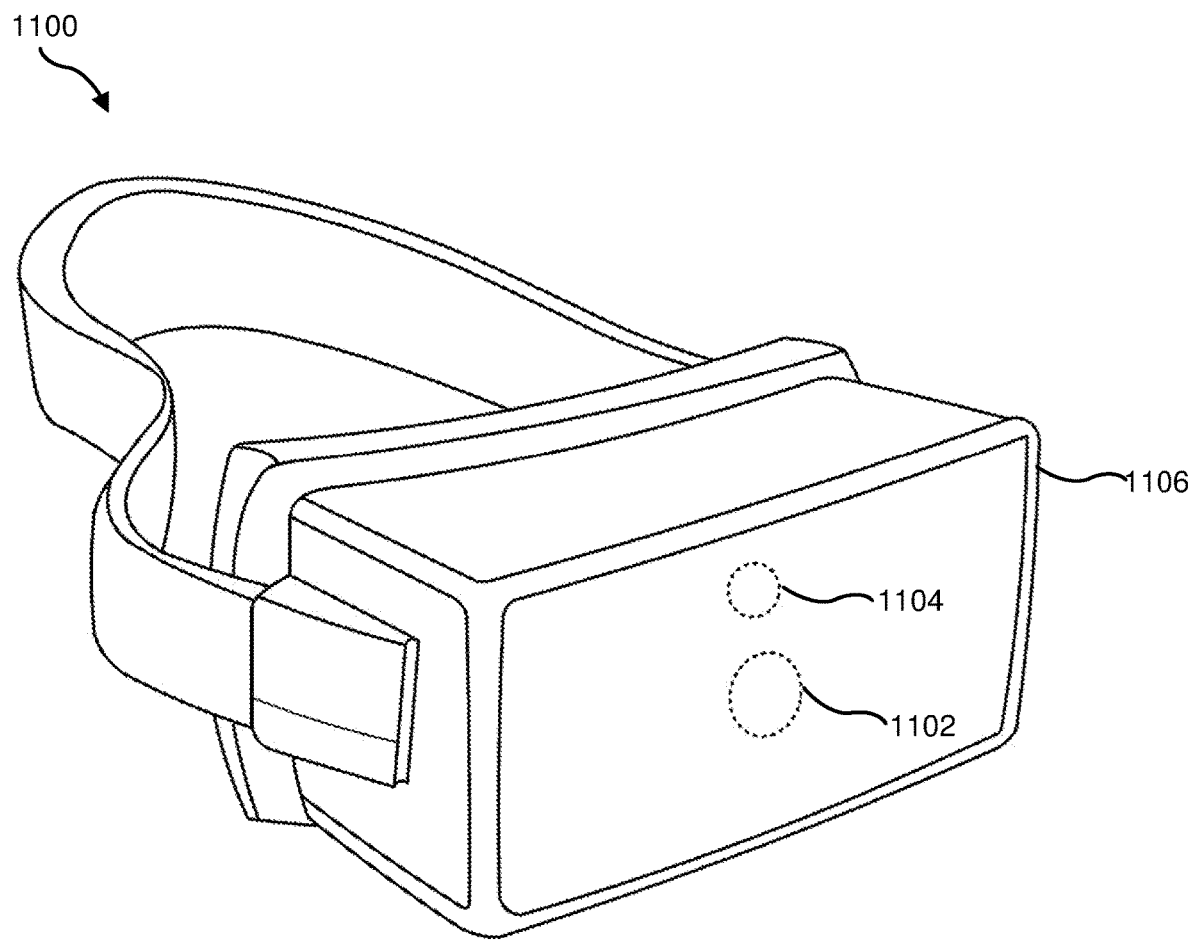
FIG. 11 is a perspective view of an exemplary head-mounted display (HMD) in which embodiments of a structured light projector may be employed.

FIG. 11 is a perspective view of an exemplary head-mounted display (HMD) 1100 in which embodiments of a structured light projector (e.g., structured light projector 100, 300, 400, 500, 600, 700, or 800) may be employed. In an example, an imaging device 1102 or system that incorporates a depth camera assembly or system may be included within HMD 1100. As shown in FIG. 11, HMD 1100 may include a front rigid body 1106 through which an aperture (included within imaging device 1102) may receive light. In some such examples, imaging device 1102 may operate within a local area imaging assembly, which may be included within HMD 1100, as illustrated in FIG. 11. In these examples, as will be discussed in greater detail in connection with FIG. 12, the local area imaging assembly may include an illumination source 1104 (e.g., structured light projector 100, 300, 400, 500, 600, 700, or 800) that may emit light through front rigid body 1106 of HMD 1100.

Figure 12:
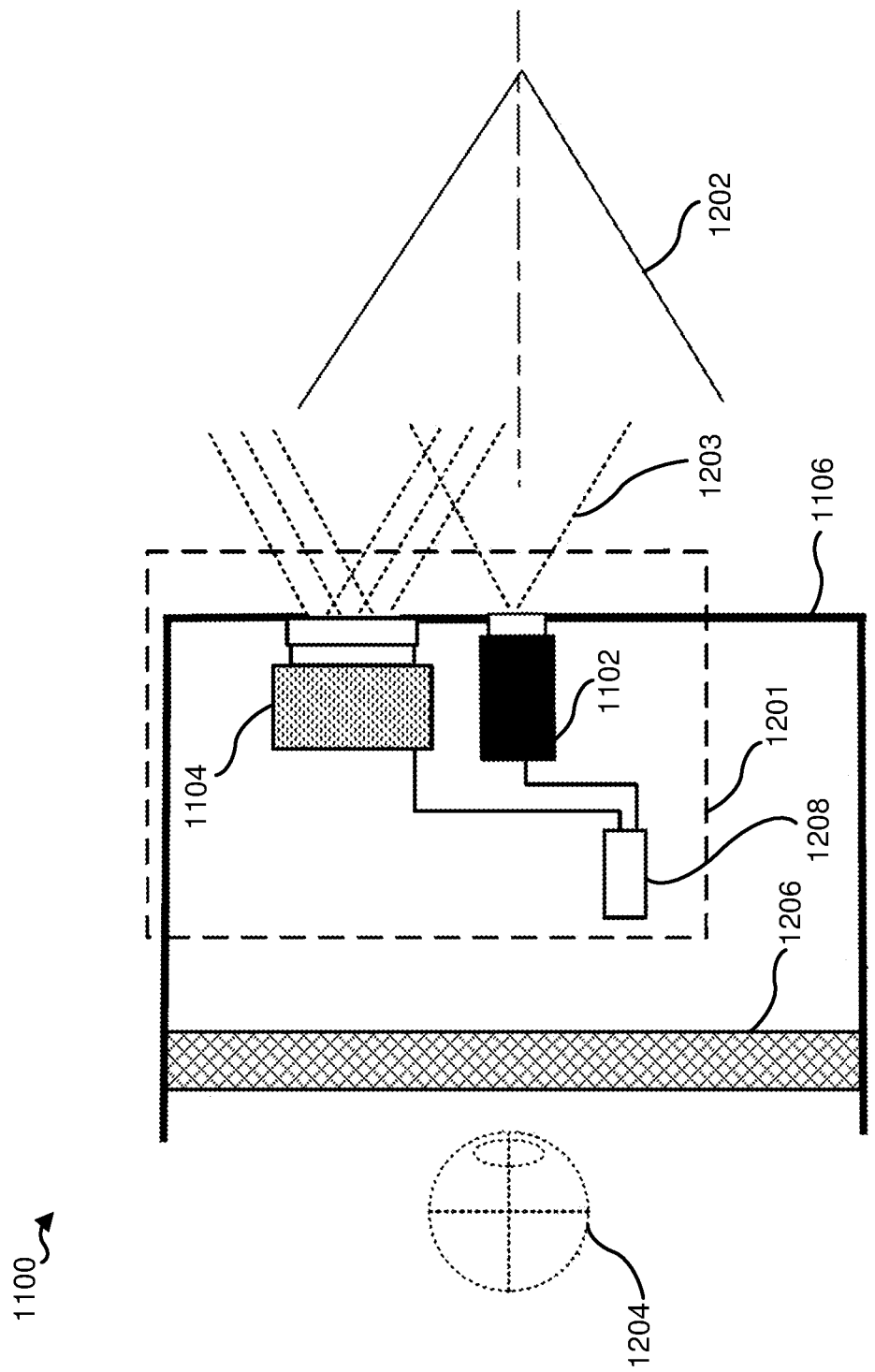
FIG. 12 is a cross-sectional view of the HMD of FIG. 11.

FIG. 12 represents a cross section of front rigid body 1106 of HMD 1100. As shown in FIG. 12, HMD 1100 may include a local area imaging assembly 1201. In some examples, local area imaging assembly 1201 may be a device assembly configured to capture image data by way of received light 1203 that is utilized in determining, mapping, and/or tracking position, orientation, and/or movement of objects within an area, such as local area 1202 (e.g., an area surrounding HMD 1100). In some examples, local area imaging assembly 1201 may include (1) imaging device 1102 and (2) illumination source 1104 configured to emit light (e.g., structured light 150 of FIG. 1) into local area 1202.

In some embodiments, local area imaging assembly 1201 may determine depth and/or surface information for objects within local area 1202 in a variety of ways. For example, local area imaging assembly 1201 may be utilized in a simultaneous localization and mapping (SLAM) tracking system to identify and/or map features of local area 1202 and/or to identify a location, orientation, and/or movement of HMD 1100 and/or other objects (e.g., hand-held controllers, users, etc.) in local area 1202. In some examples, illumination source 1104 may emit a structured light pattern (e.g., structured light 150, such as a symmetric and/or quasi-random dot pattern, a grid pattern, horizontal bars, etc.) into local area 1202. In these examples, local area imaging assembly 1201 may determine the depth and/or surface information based on triangulation or perceived deformation of the emitted pattern. More specifically, in at least some examples, the depth and/or surface information may be determined by capturing received light 1203 reflected from local area 1202 using imaging device 1102 and calculating the depth from local area imaging assembly 1201 to multiple points in local area 1202 (e.g., using trigonometry) based on the appearance of received light 1203 at imaging device 1102, the orientation of illumination source 1104 and imaging device 1102, and the distance between illumination source 1104 and imaging device 1102.

In some examples, information collected by local area imaging assembly 1201 may be used as part of an image and/or video (e.g., an artificial reality image and/or video) displayed to a user wearing HMD 1100. In one example, shown in FIG. 12, the image and/or video may be displayed to a user (e.g., via an eye 1204 of the user) by an electronic display 1206. Electronic display 1206 may represent a single electronic display or multiple electronic displays (e.g., a display for each eye of a user). Examples of electronic display 1206 may include, without limitation, a liquid crystal display (LCD), an organic light-emitting diode (OLED) display, an inorganic light-emitting diode (ILED) display, an active-matrix organic light-emitting diode (AMOLED) display, a transparent organic light-emitting diode (TOLED) display, a projector, a cathode ray tube, an optical mixer, and/or some combination thereof. The local area imaging assembly 1201 may also include an imaging controller 1208 (e.g., controller 160 of FIG. 1) that is coupled to illumination source 1104 and/or imaging device 1102.

In at least one embodiment, a head-mounted display system including HMD 1100 may additionally or alternatively include controller tracking features (e.g., constellation tracking). For example, in addition to determining features of local area 1202, local area imaging assembly 1201 may track a position, orientation, and/or movement of one or more controller devices, such as hand-held controllers, that are utilized by a user for interacting with HMD 1100 and/or local area 1202.

Aside from the embodiments of FIGS. 11 and 12 associated with a head-mounted display system, other systems providing some form of artificial reality, such as those that include near-eye displays (NEDs), may also benefit from the use of the examples of structured light projectors described above. Moreover, in some examples, other types of systems not associated with artificial reality technology may also advantageously employ the structured light projector embodiments discussed in detail above.

In some examples, the term "controller" generally refers to any type or form of hardware-implemented processing unit that may include hardware logic for performing various control functions, or that may be capable of interpreting and/or executing computer-readable instructions to perform such functions. Examples of controllers may include, without limitation, physical processors, such as microprocessors, microcontrollers, Central Processing Units (CPUs), Field-Programmable Gate Arrays (FPGAs) that implement soft-core processors, Application-Specific Integrated Circuits (ASICs), portions of one or more of the same, variations or combinations of one or more of the same, or any other suitable physical processor.

Embodiments of the instant disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality.

Artificial reality systems may be implemented in a variety of different form factors and configurations. Some artificial reality systems may be designed to work without near-eye displays (NEDs), an example of which is AR system 1300 in FIG. 13. Other artificial reality systems may include a NED that also provides visibility into the real world (e.g., AR system 1400 in FIG. 14) or that visually immerses a user in an artificial reality (e.g., VR system 1500 in FIG. 15). While some artificial reality devices may be self-contained systems, other artificial reality devices may communicate and/or coordinate with external devices to provide an artificial reality experience to a user. Examples of such external devices include handheld controllers, mobile devices, desktop computers, devices worn by a user, devices worn by one or more other users, and/or any other suitable external system.

Figure 13:
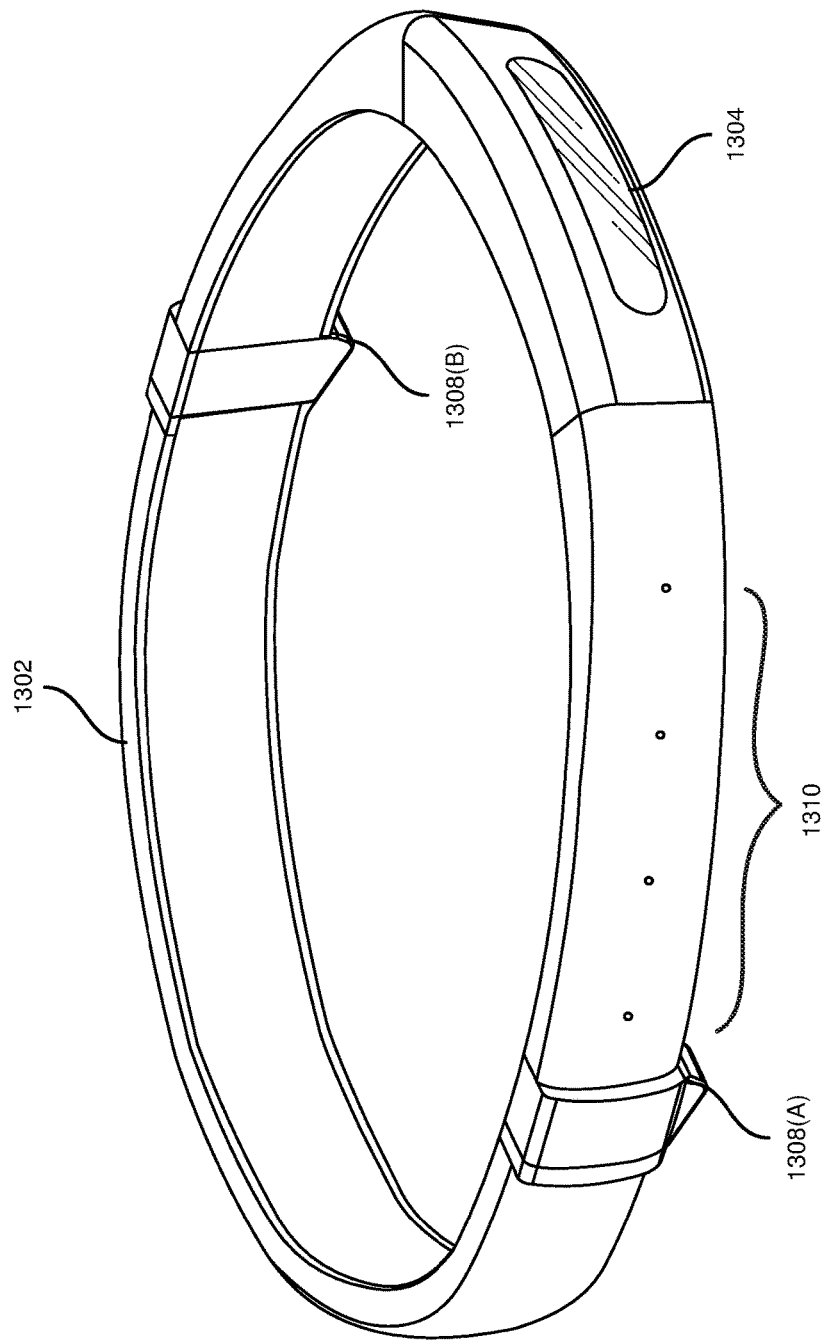
FIG. 13 is a perspective view of an exemplary augmented reality system that may employ various methods disclosed herein.

Turning to FIG. 13, AR system 1300 generally represents a wearable device dimensioned to fit about a body part (e.g., a head) of a user. As shown in FIG. 13, AR system 1300 may include a frame 1302 and a camera assembly 1304 that is coupled to frame 1302 and configured to gather information about a local environment by observing the local environment. AR system 1300 may also include one or more audio devices, such as output audio transducers 1308(A) and 1308(B) and input audio transducers 1310. Output audio transducers 1308(A) and 1308(B) may provide audio feedback and/or content to a user, and input audio transducers 1310 may capture audio in a user's environment.

As shown, AR system 1300 may not necessarily include a NED positioned in front of a user's eyes. AR systems without NEDs may take a variety of forms, such as head bands, hats, hair bands, belts, watches, wrist bands, ankle bands, rings, neckbands, necklaces, chest bands, eyewear frames, and/or any other suitable type or form of apparatus. While AR system 1300 may not include a NED, AR system 1300 may include other types of screens or visual feedback devices (e.g., a display screen integrated into a side of frame 1302).

Figure 14:
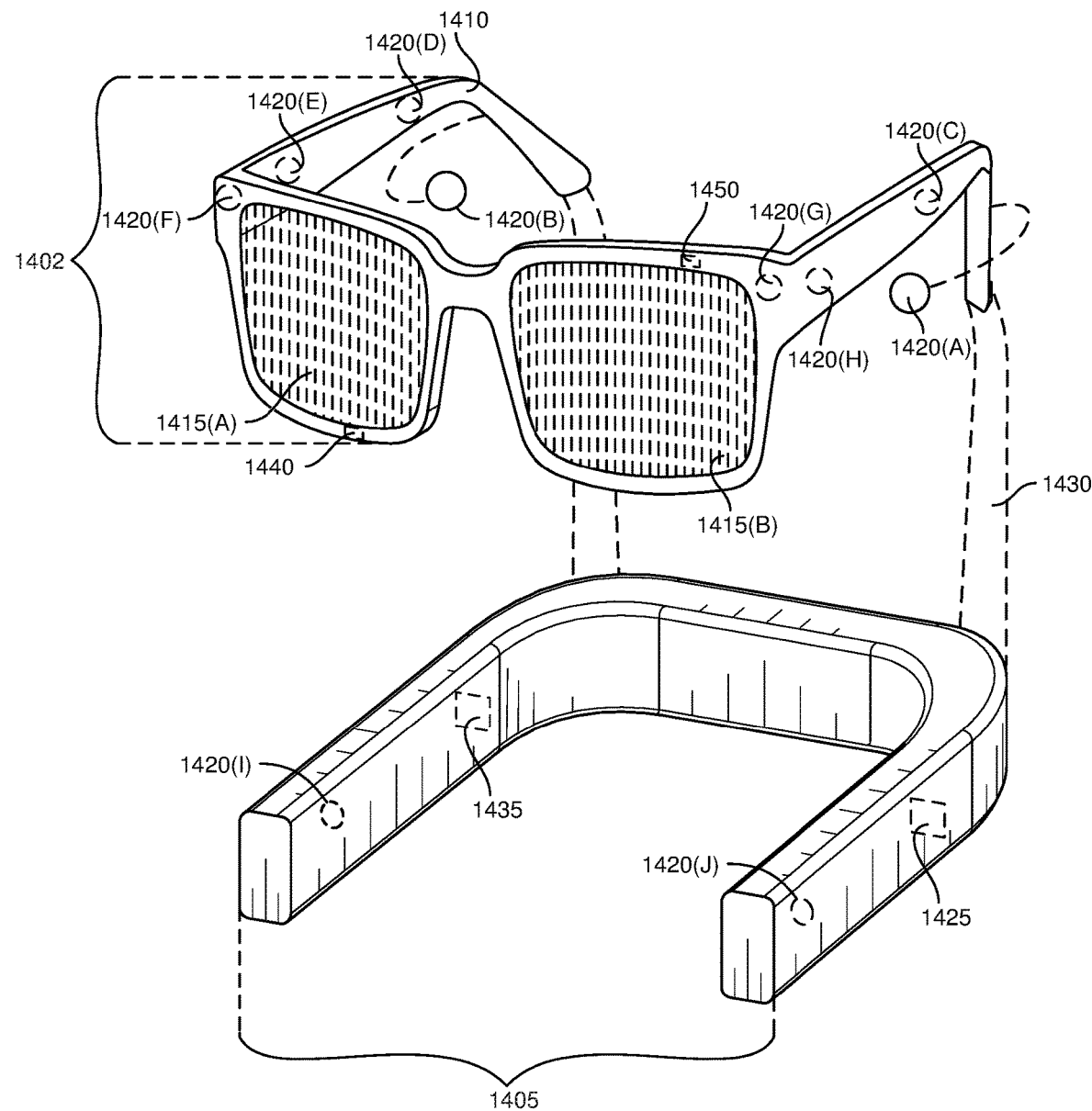
FIG. 14 is a perspective view of another exemplary augmented reality system that may employ various methods disclosed herein.

The embodiments discussed in this disclosure may also be implemented in AR systems that include one or more NEDs. For example, as shown in FIG. 14, AR system 1400 may include an eyewear device 1402 with a frame 1410 configured to hold a left display device 1415(A) and a right display device 1415(B) in front of a user's eyes. Display devices 1415(A) and 1415(B) may act together or independently to present an image or series of images to a user. While AR system 1400 includes two displays, embodiments of this disclosure may be implemented in AR systems with a single NED or more than two NEDs.

In some embodiments, AR system 1400 may include one or more sensors, such as sensor 1440. Sensor 1440 may generate measurement signals in response to motion of AR system 1400 and may be located on substantially any portion of frame 1410. Sensor 1440 may include a position sensor, an inertial measurement unit (IMU), a depth camera assembly, or any combination thereof. In some embodiments, AR system 1400 may or may not include sensor 1440 or may include more than one sensor. In embodiments in which sensor 1440 includes an IMU, the IMU may generate calibration data based on measurement signals from sensor 1440. Examples of sensor 1440 may include, without limitation, accelerometers, gyroscopes, magnetometers, other suitable types of sensors that detect motion, sensors used for error correction of the IMU, or some combination thereof.

AR system 1400 may also include a microphone array with a plurality of acoustic sensors 1420(A)-1420(J), referred to collectively as acoustic sensors 1420. Acoustic sensors 1420 may be transducers that detect air pressure variations induced by sound waves. Each acoustic sensor 1420 may be configured to detect sound and convert the detected sound into an electronic format (e.g., an analog or digital format). The microphone array in FIG. 14 may include, for example, ten acoustic sensors: 1420(A) and 1420(B), which may be designed to be placed inside a corresponding ear of the user, acoustic sensors 1420(C), 1420(D), 1420(E), 1420(F), 1420(G), and 1420(H), which may be positioned at various locations on frame 1410, and/or acoustic sensors 1420(I) and 1420(J), which may be positioned on a corresponding neckband 1405.

The configuration of acoustic sensors 1420 of the microphone array may vary. While AR system 1400 is shown in FIG. 14 as having ten acoustic sensors 1420, the number of acoustic sensors 1420 may be greater or less than ten. In some embodiments, using higher numbers of acoustic sensors 1420 may increase the amount of audio information collected and/or the sensitivity and accuracy of the audio information. In contrast, using a lower number of acoustic sensors 1420 may decrease the computing power required by the controller 1450 to process the collected audio information. In addition, the position of each acoustic sensor 1420 of the microphone array may vary. For example, the position of an acoustic sensor 1420 may include a defined position on the user, a defined coordinate on the frame 1410, an orientation associated with each acoustic sensor, or some combination thereof.

Acoustic sensors 1420(A) and 1420(B) may be positioned on different parts of the user's ear, such as behind the pinna or within the auricle or fossa. Or, there may be additional acoustic sensors on or surrounding the ear in addition to acoustic sensors 1420 inside the ear canal. Having an acoustic sensor positioned next to an ear canal of a user may enable the microphone array to collect information on how sounds arrive at the ear canal. By positioning at least two of acoustic sensors 1420 on either side of a user's head (e.g., as binaural microphones), AR device 1400 may simulate binaural hearing and capture a 3D stereo sound field around about a user's head. In some embodiments, acoustic sensors 1420(A) and 1420(B) may be connected to AR system 1400 via a wired connection, and in other embodiments, the acoustic sensors 1420(A) and 1420(B) may be connected to AR system 1400 via a wireless connection (e.g., a Bluetooth connection). In still other embodiments, acoustic sensors 1420(A) and 1420(B) may not be used at all in conjunction with AR system 1400.

Acoustic sensors 1420 on frame 1410 may be positioned along the length of the temples, across the bridge, above or below display devices 1415(A) and 1415(B), or some combination thereof. Acoustic sensors 1420 may be oriented such that the microphone array is able to detect sounds in a wide range of directions surrounding the user wearing the AR system 1400. In some embodiments, an optimization process may be performed during manufacturing of AR system 1400 to determine relative positioning of each acoustic sensor 1420 in the microphone array.

AR system 1400 may further include or be connected to an external device (e.g., a paired device), such as neckband 1405. As shown, neckband 1405 may be coupled to eyewear device 1402 via one or more connectors 1430. Connectors 1430 may be wired or wireless connectors and may include electrical and/or non-electrical (e.g., structural) components. In some cases, eyewear device 1402 and neckband 1405 may operate independently without any wired or wireless connection between them. While FIG. 14 illustrates the components of eyewear device 1402 and neckband 1405 in example locations on eyewear device 1402 and neckband 1405, the components may be located elsewhere and/or distributed differently on eyewear device 1402 and/or neckband 1405. In some embodiments, the components of eyewear device 1402 and neckband 1405 may be located on one or more additional peripheral devices paired with eyewear device 1402, neckband 1405, or some combination thereof. Furthermore, neckband 1405 generally represents any type or form of paired device. Thus, the following discussion of neckband 1405 may also apply to various other paired devices, such as smart watches, smart phones, wrist bands, other wearable devices, hand-held controllers, tablet computers, laptop computers, etc.

Pairing external devices, such as neckband 1405, with AR eyewear devices may enable the eyewear devices to achieve the form factor of a pair of glasses while still providing sufficient battery and computation power for expanded capabilities. Some or all of the battery power, computational resources, and/or additional features of AR system 1400 may be provided by a paired device or shared between a paired device and an eyewear device, thus reducing the weight, heat profile, and form factor of the eyewear device overall while still retaining desired functionality. For example, neckband 1405 may allow components that would otherwise be included on an eyewear device to be included in neckband 1405 since users may tolerate a heavier weight load on their shoulders than they would tolerate on their heads. Neckband 1405 may also have a larger surface area over which to diffuse and disperse heat to the ambient environment. Thus, neckband 1405 may allow for greater battery and computation capacity than might otherwise have been possible on a stand-alone eyewear device. Since weight carried in neckband 1405 may be less invasive to a user than weight carried in eyewear device 1402, a user may tolerate wearing a lighter eyewear device and carrying or wearing the paired device for greater lengths of time than a user would tolerate wearing a heavy standalone eyewear device, thereby enabling an artificial reality environment to be incorporated more fully into a user's day-to-day activities.

Neckband 1405 may be communicatively coupled with eyewear device 1402 and/or to other devices. The other devices may provide certain functions (e.g., tracking, localizing, depth mapping, processing, storage, etc.) to AR system 1400. In the embodiment of FIG. 14, neckband 1405 may include two acoustic sensors (e.g., 1420(I) and 1420(J)) that are part of the microphone array (or potentially form their own microphone subarray). Neckband 1405 may also include a controller 1425 and a power source 1435.

Acoustic sensors 1420(I) and 1420(J) of neckband 1405 may be configured to detect sound and convert the detected sound into an electronic format (analog or digital). In the embodiment of FIG. 14, acoustic sensors 1420(I) and 1420 (J) may be positioned on neckband 1405, thereby increasing the distance between the neckband acoustic sensors 1420(I) and 1420(J) and other acoustic sensors 1420 positioned on eyewear device 1402. In some cases, increasing the distance between acoustic sensors 1420 of the microphone array may improve the accuracy of beamforming performed via the microphone array. For example, if a sound is detected by acoustic sensors 1420(C) and 1420(D) and the distance between acoustic sensors 1420(C) and 1420(D) is greater than, e.g., the distance between acoustic sensors 1420(D) and 1420(E), the determined source location of the detected sound may be more accurate than if the sound had been detected by acoustic sensors 1420(D) and 1420(E).

Controller 1425 of neckband 1405 may process information generated by the sensors on neckband 1405 and/or AR system 1400. For example, controller 1425 may process information from the microphone array that describes sounds detected by the microphone array. For each detected sound, controller 1425 may perform a DoA estimation to estimate a direction from which the detected sound arrived at the microphone array. As the microphone array detects sounds, controller 1425 may populate an audio data set with the information. In embodiments in which AR system 1400 includes an inertial measurement unit, controller 1425 may compute all inertial and spatial calculations from the IMU located on eyewear device 1402. Connector 1430 may convey information between AR system 1400 and neckband 1405 and between AR system 1400 and controller 1425. The information may be in the form of optical data, electrical data, wireless data, or any other transmittable data form. Moving the processing of information generated by AR system 1400 to neckband 1405 may reduce weight and heat in eyewear device 1402, making it more comfortable to the user.

Power source 1435 in neckband 1405 may provide power to eyewear device 1402 and/or to neckband 1405. Power source 1435 may include, without limitation, lithium ion batteries, lithium-polymer batteries, primary lithium batteries, alkaline batteries, or any other form of power storage. In some cases, power source 1435 may be a wired power source. Including power source 1435 on neckband 1405 instead of on eyewear device 1402 may help better distribute the weight and heat generated by power source 1435.

As noted, some artificial reality systems may, instead of blending an artificial reality with actual reality, substantially replace one or more of a user's sensory perceptions of the real world with a virtual experience. One example of this type of system is a head-worn display system, such as VR system 1500 in FIG. 15, that mostly or completely covers a user's field of view. VR system 1500 may include a front rigid body 1502 and a band 1504 shaped to fit around a user's head. VR system 1500 may also include output audio transducers 1506(A) and 1506(B). Furthermore, while not shown in FIG. 15, front rigid body 1502 may include one or more electronic elements, including one or more electronic displays, one or more inertial measurement units (IMUS), one or more tracking emitters or detectors, and/or any other suitable device or system for creating an artificial reality experience.

Artificial reality systems may include a variety of types of visual feedback mechanisms. For example, display devices in AR system 1400 and/or VR system 1500 may include one or more liquid crystal displays (LCDs), light emitting diode (LED) displays, organic LED (OLED) displays, and/or any other suitable type of display screen. Artificial reality systems may include a single display screen for both eyes or may provide a display screen for each eye, which may allow for additional flexibility for varifocal adjustments or for correcting a user's refractive error. Some artificial reality systems may also include optical subsystems having one or more lenses (e.g., conventional concave or convex lenses, Fresnel lenses, adjustable liquid lenses, etc.) through which a user may view a display screen.

In addition to or instead of using display screens, some artificial reality systems may include one or more projection systems. For example, display devices in AR system 1400 and/or VR system 1500 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial reality content and the real world. Artificial reality systems may also be configured with any other suitable type or form of image projection system.

Artificial reality systems may also include various types of computer vision components and subsystems. For example, AR system 1300, AR system 1400, and/or VR system 1500 may include one or more optical sensors such as two-dimensional (2D) or three-dimensional (3D) cameras, time-of-flight depth sensors, single-beam or sweeping laser rangefinders, 3D LiDAR sensors, and/or any other suitable type or form of optical sensor. An artificial reality system may process data from one or more of these sensors to identify a location of a user, to map the real world, to provide a user with context about real-world surroundings, and/or to perform a variety of other functions.

Artificial reality systems may also include one or more input and/or output audio transducers. In the examples shown in FIGS. 13 and 15, output audio transducers 1308 (A), 1308(B), 1506(A), and 1506(B) may include voice coil speakers, ribbon speakers, electrostatic speakers, piezoelectric speakers, bone conduction transducers, cartilage conduction transducers, and/or any other suitable type or form of audio transducer. Similarly, input audio transducers 1310 may include condenser microphones, dynamic microphones, ribbon microphones, and/or any other type or form of input transducer. In some embodiments, a single transducer may be used for both audio input and audio output.

Figure 15:
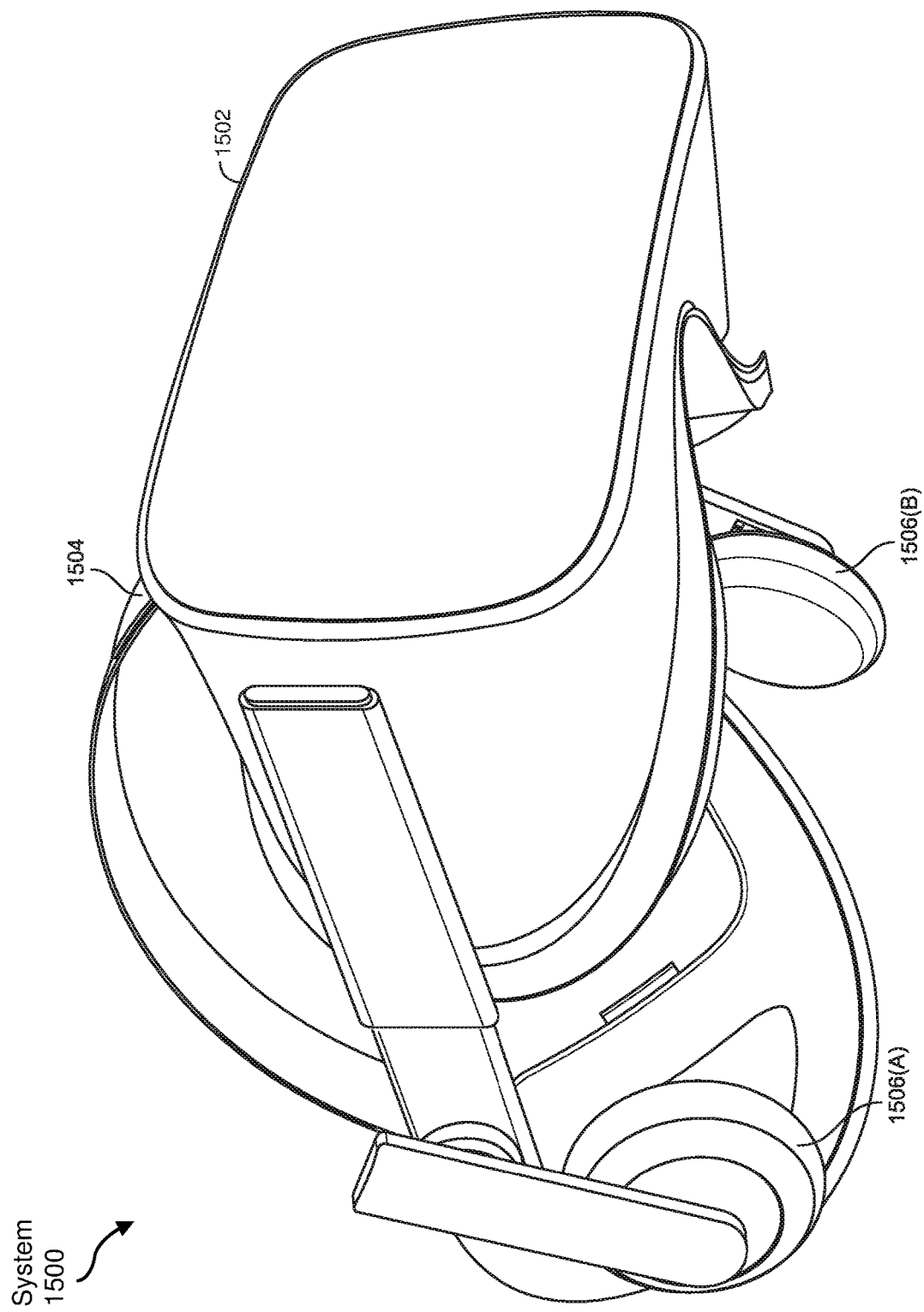
FIG. 15 is a perspective view of an exemplary virtual reality system that may employ various methods disclosed herein.

While not shown in FIGS. 13-15, artificial reality systems may include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial reality devices, within other artificial reality devices, and/or in conjunction with other artificial reality devices.

By providing haptic sensations, audible content, and/or visual content, artificial reality systems may create an entire virtual experience or enhance a user's real-world experience in a variety of contexts and environments. For instance, artificial reality systems may assist or extend a user's perception, memory, or cognition within a particular environment. Some systems may enhance a user's interactions with other people in the real world or may enable more immersive interactions with other people in a virtual world. Artificial reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visuals aids, etc.). The embodiments disclosed herein may enable or enhance a user's artificial reality experience in one or more of these contexts and environments and/or in other contexts and environments.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A structured light projector comprising:
   a light source having a light-emitting surface that emits light;
   a unitary optical element serving as an optical medium and having a first planar side securely coupled to, and in contact with, the light-emitting surface of the light source such that no gap is present between the light-emitting surface of the light source and the first planar side of the unitary optical element; and
   a diffractive optical element (DOE) stack comprising one or more DOEs, wherein the DOE stack includes:
      a light-receiving side securely coupled to, and in contact with, a second planar side of the unitary optical element opposite the first planar side; and
      a light-emitting side opposite the light-receiving side that emits structured light in response to the light being received at the light-receiving side of the DOE stack from the light-emitting surface of the light source after passing through the unitary optical element.

2. The structured light projector of claim 1, wherein the light source comprises:
   a light-emitting device; and
   a submount, wherein the light-emitting device is mounted to the submount.

3. The structured light projector of claim 2, wherein the light-emitting device comprises a vertical-cavity surface-emitting laser (VCSEL).

4. The structured light projector of claim 2, wherein:
   the submount comprises a recessed region in which the light-emitting device is mounted; and
   the unitary optical element contacts the submount at a surface external to the recessed region.

5. The structured light projector of claim 1, wherein the DOE stack comprises a collimating optical element that defines the light-receiving side of the DOE stack.

6. The structured light projector of claim 1, further comprising:
   at least one mechanical fastener that securely couples the light source, the unitary optical element, and the DOE stack together.

7. The structured light projector of claim 1, wherein the light source, the unitary optical element, and the DOE stack are secured together using an adhesive.

8. The structured light projector of claim 1, wherein the unitary optical element comprises a single continuous block of optical material.

9. The structured light projector of claim 8, wherein the optical material comprises glass.

10. The structured light projector of claim 8, wherein the optical material comprises a polymer.

11. The structured light projector of claim 10, wherein the polymer comprises an injected optical polymer.

12. The structured light projector of claim 11, wherein the injected optical polymer comprises a dielectric material.

13. A method of generating structured light, comprising:
   emitting, from a light-emitting surface of a light source, light toward a first planar side of a unitary optical element serving as an optical medium, wherein the light-emitting surface is mechanically coupled directly to, and in contact with, the first planar side of the unitary optical element such that no gap is present between the light-emitting surface of the light source and the first planar side of the unitary optical element;

delivering, by the unitary optical element, the light received at the first planar side through a second planar side of the unitary optical element opposite the first planar side after passing through the unitary optical element to a light-receiving side of a diffractive optical element (DOE) stack comprising one or more DOEs, wherein the second planar side is mechanically coupled directly to, and in contact with, the light-receiving side of the DOE stack; and emitting, from a light-emitting side of the DOE stack opposite the light-receiving side, structured light in response to the light being received at the light-receiving side of the DOE stack.

14. An artificial reality system comprising:

a structured light projector comprising:
- a light source having a light-emitting surface that emits light;
- a unitary optical element serving as an optical medium and having a first planar side securely coupled to, and in contact with, the light-emitting surface of the light source such that no gap is present between the light-emitting surface of the light source and the first planar side of the unitary optical element; and
- a diffractive optical element (DOE) stack comprising one or more DOEs, wherein the DOE stack includes:
    - a light-receiving side securely coupled to, and in contact with, a second planar side of the unitary optical element opposite the first planar side; and
    - a light-emitting side opposite the light-receiving side that emits structured light into a local area in response to the light being received at the light-receiving side of the DOE stack from the light-emitting surface of the light source after passing through the unitary optical element;

an optical sensor that receives at least a portion of the structured light that is reflected by the local area;

a processor that determines depth information of the local area based on the portion of the structured light received by the optical sensor; and a display that displays information based on the depth information.

15. The artificial reality system of claim 14, wherein the display comprises a near-eye display.

* * * * *